United States Patent Office 3,380,928
Patented Apr. 30, 1968

3,380,928
LUBRICATING OIL COMPOSITION
John Hughes, Ellesmere Port, and Joseph M. Soesan, Ilford, England, assignors to Shell Oil Company, a corporation of Delaware
No Drawing. Filed Mar. 27, 1959, Ser. No. 802,291
Claims priority, application Great Britain, Sept. 22, 1958, 30,212/58
3 Claims. (Cl. 252—327)

This invention relates to improved lubricating oils and additives therefor.

Multigrade lubricating oils have found rather wide acceptance and have certain advantages over conventional single grade lubricating oils. The multigrade types are capable of effectively lubricating over a wide temperature range and at lower oil consumption, particularly at high engine speeds and temperatures.

The viscosity characteristics of multigrade oils are such that they remain fluid at low temperature to insure cold starting and good oil circulation during warmup, and have enough body at high temperatures to provide protection at high speed operations. The viscosity reduction at the lower temperatures reduces friction, improves fuel economy and protects the engine due to the fluidity of the oil at the time the engine is started. Additionally, it is possible to omit bright stock fractions from such oils which conventional single grade oils usually contain and which tend to cause engine octane number requirement increase, surface ignition and spark plug fouling.

Conventional multigrade oils are usually low viscosity base oils compounded with relatively large amounts (5-15%) of viscosity index improvers such as are sold commercially under the trade name of "Paratone," "Santodex" and "Acryloid" of the 150, 618 or 710 type. The first two types are hydrocarbons exemplified by polyisobutylene and condensation products containing alkyl and aryl radicals, e.g., condensation products of chlorinated wax with naphthalenes or copolymers of styrene with $C_{2-12}$ olefins. The "Acryloid" polymers are oxygen-containing copolymers of dissimilar esters of acrylic acids such as copolymers of mixtures of octyl, lauryl or stearyl methacrylates. The viscosity index improvers of this type are generally only effective for short periods of time due to their inability to resist mechanical degradation caused by the high shearing forces to which the polymers are subjected in the engine, their tendency to cause oxidation, gumming and the like.

It has now been found that the effectiveness of multigrade mineral lubricating oil compositions can be substantially improved, and undesired side effects substantially reduced by incorporation of a minor amount of from about 0.1% to about 20% by weight, preferably from about 1% to about 5% of a salt of an oil-soluble polymeric amine and an organo phosphorus acid. The term "organo phosphorus acid" includes any acid organic compound derived from an acid of phosphorus and includes partial esters of the oxyacids and thioacids of phosphorus, phosphonic acids and phosphinic acids.

The said salts are novel and are themselves a feature of the invention. In addition to being viscosity index improvers, they also impart extreme pressure properties to the base oil because of the action of the phosphorus-containing acid part of the molecule.

By the term "polymeric amine" herein is meant a polymer, including copolymers, containing basic nitrogen-containing groups, which may be derived from polymerizable monomers containing primary, secondary or tertiary (the latter two are preferred) amino nitrogen, including basic heterocyclic amino nitrogen-containing substances having an ethylenically unsaturated polymerizable group.

Various well known polymeric amines are suitable for the preparation of salts which are useful in the present invention. They may be simple polymers, such as those obtained by polymerizing vinyl substituted basic heterocyclic nitrogen-containing substances such as vinyl pyridine, vinyl picoline and vinyl quinoline or vinyl arylamines such as para-aminostyrene, or polyamines prepared by reducing, in the presence of ammonia or primary or secondary amines, the polymerized acrylates and methacrylates of hydroxy alkyl tertiary amines, and the polymeric amines obtained by reacting polymers containing epoxy groups with ammonia or primary or secondary amines. The preferred polymeric amine compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British patent specification 760,544 and U.S. Patent 2,839,512. The copolymers include copolymers of stearyl methacrylate and 2-methyl-5-vinyl pyridine, copolymers of stearyl methacrylate, lauryl methacrylate and 2-methyl-5-vinyl pyridine, and those which contain additional $C_{1-4}$ alkyl methacrylates in the polymer also such as copolymer of stearyl methacrylate, lauryl methacrylate, methyl methacrylate and 2-methyl-5-vinyl pyridine, and similar copolymers in which the methyl methacrylate is replaced by butyl methacrylate and the 2-methyl-5-vinyl pyridine is replaced by 5-ethyl-5-vinyl pyridine and mixtures thereof.

The organo phosphorus acids used to form the salts of this invention are preferably partial esters of oxyacids of phosphorus, particularly of phosphoric acid. They may be alkyl, cycloalkyl or aryl esters and preferably they have up to 30 carbon atoms in the molecule. Typical of such esters are the mono- and di-butyl, hexyl, octyl, nonyl, decyl, dodecyl and octadecyl esters of phosphoric acid and of phosphorous acid, mono- or di-cyclohexyl phosphate or phosphite and mono- or di-phenyl, cresyl or xylenyl phosphate or phosphite. Of these, the di-esters of phosphoric acid are preferred.

The partial esters of the thioacids of phosphorus may also be used, for example, the esters referred to above in which one or more of the oxygen atoms is replaced by a sulfur atom, such as dinonyl or dicyclohexyl dithiophosphoric acid and monodecyl monothiophosphoric acid.

The alcohols and phenols from which the above-mentioned partial esters are derived may be substituted, for example, by halogen atoms or hydroxy, ether, carbalkoxy, nitro or cyano groups. Thus partial esters such as dichlorophenyl phosphate may be used.

The organo phosphorus acid may be a phosphinic acid, such as di-octane or di-tetradecanephosphinic acid, dibenzylphosphinic acid, diphenylphosphinic acid, phenylmethylphosphinic acid, phenylethylphosphinic acid and isobutylphenylphosphinic acid, or a phosphonic acid, such as benzene, p-toluene, hexane-, octane-, decane- or dodecane-1-phosphonic acid and cyclohexanephosphonic acid. The hydrocarbon group in the phosphinic or phosphonic acid may be substituted as, for example, in di(alpha-hydroxyisopropyl)phosphinic acid, 2-chloroethanephosphonic acid, 1-carboethoxypropane-1- or -2-phosphinic acid, 3-hydroxypropane-1-phosphonic acid. Such acids may be prepared as described in British Patent 660,918.

The corresponding thiophosphonic and thiophosphinic acids may also be used.

The salts used in accordance with this invention may be prepared by any of the conventional methods for preparing salts of organic amines and organic acids. Thus, the polymeric amine may be dissolved in an organic solvent, such as benzene or xylene, and the acid added to the solution with agitation. The acid itself may, of course, be dissolved in a suitable solvent. Alternatively, the polymeric amine may be suspended in a suitable liquid medium and the acid stirred into the suspension. When using these methods, it may be necessary to isolate the salt by removing the solvent or suspending medium before the salt is added to the lubricating oil. Simpler methods, such as merely adding the acid to the melted polymeric amine, are also suitable on occasion. Also the acid and the polymeric amine may be added to the lubricating oil to form the salt in situ.

It is not essential that all the basic nitrogen groups in the polymer be neutralized by the acid. In fact, better results may be obtained when the final product contains some un-neutralized basic nitrogen atoms. To leave some un-neutralized basic nitrogen atoms may be desirable if the salt is required to act as a detergent additive as well as a viscosity index improver.

The basic nitrogen-containing polymeric salts of organophosphorus acids used in oil compositions of the present invention are novel salts and form one feature of the present invention. Of this class of novel salts, those are preferred which are derived from copolymers having a molecular weight of from about 75,000 to about 1,000,000 and derived from a vinyl pyridine and an ester of an acrylic acid in which the acrylic acid moiety has no more than 5 carbon atoms. Preferably the copolymer is one in which the molar ratio of polymerizable nitrogen base compound to polymerizable unsaturated material free of heterocyclic nitrogen-containing radicals in the copolymer is from about 1:1 to about 1:4.

The following examples illustrate the preparation of the novel salts provided by the present invention. In these examples, the parts referred to are parts by weight unless otherwise specified, and the relations of parts by weight to parts by volume is that of the kilogram to the liter.

Example I

The polymeric amine employed was one prepared by copolymerizing a mixture comprising 12% of methyl methacrylate, 23% of technical stearyl methacrylate, 60% of technical lauryl methacrylate and 5% of 2-methyl-5-vinyl pyridine (mol. wt. 750,000) by the method described in U.S. Patent 2,839,512. Three parts by weight of this copolymer were dissolved in 10 parts by weight of benzene, and a slight excess of hydrochloric acid (based on the nitrogen content) was added. The mixture was refluxed under a Dean and Stark head until no more water separated. To the benzene solution was added a stoichiometric amount of the sodium salt of dinonyl phosphate so that the mole ratio of nitrogen in the copolymer to the phosphate is in a 1:1 ratio. Sodium chloride precipitated and was filtered off. The filtrate was distilled under reduced pressure to remove the benzene, the final traces being removed on a steam bath at 0.1 mm. Hg pressure. The residue was the dinonyl phosphate of the polymeric amine.

Example II

The polymeric amine described in Example I was dissolved in benzene and an excess of concentrated hydrochloric acid was added. Excess hydrogen chloride to that required to form the amine hydrochloride salt of the copolymer was distilled off, the water present also being removed by aseotropic distillation using a Dean and Stark head. The resulting solution was cooled to ca. 60° C. and then a solution of sodium di(3,5,5-trimethylhexyl) dithiophosphate (the stoichiometrical quantity based on the basic nitrogen content of the original copolymer) in benzene was added. The reactants were stirred together for 30 minutes at 60° C. The benzene solution when cool was filtered to remove sodium chloride formed during the salt formation. Removal of solvent under reduced pressure on the steam bath gave the dinonyl dithiophosphate of the polymeric amine.

Example III 34 parts of lauryl methacrylate/beta-dimethylamino ethylmethacrylate (3:1) copolymer, having a molecular weight of about 500,000, was dissolved in 50 parts by volume of a mineral lubricating oil having a viscosity of 75 SUS at 100° F. The solution was heated at 100° C. and the equivalent quantity (2.1 parts by weight) of dicresyl hydrogen phosphate was added, resulting in a solution of the phosphate of the polymeric amine in the lubricating oil.

Other examples of additives of this invention include:

(IV) oil-soluble salt of vinyl pyridine/lauryl methacrylate copolymer and dilauryl acid phosphate,
(V) oil-soluble salt of vinyl quinoline/lauryl methacrylate copolymer and dodecane-1-phosphonic acid,
(VI) oil-soluble salt of vinyl pyridine/stearyl methacrylate copolymer and ditetradecane-1-phosphinic acid,
(VII) oil-soluble salt of polymer of p-aminostyrene/stearyl methacrylate copolymer and ditetradecane phosphonic acid,
(VIII) oil-soluble salt of beta-dimethylaminoethyl methacrylate/lauryl methacrylate copolymer and dioctyl acid phosphate,
(IX) oil-soluble salt of allylamine/lauryl methacrylate copolymer and dicyclohexyl acid phosphate,
(X) oil-soluble salt of vinyl quinoline/stearyl methacrylate copolymer and dicyclohexyl acid dithiophosphate.

The polymeric salts when added to lubricating oils produce an outstanding lubricant. The lubricating oil can be be any natural or synthetic oil having lubricating properties. Thus, the oil may be a hydrocarbon lubricating oil obtained from a paraffinic or naphthenic crude or mixture thereof. The viscosity of these oils may vary over a wide range, such as from 60 SUS at 100° F. to 50 SUS at 210° F. The hydrocarbon lubricating oils may be blended with fatty oils, such as castor oil, and/or with synthetic lubricating oils, such as polymerized olefins, copolymers of alkalene glycols and alkylene glycols and alkene oxides, organic esters, such as a di(e-ethyl hexyl)sebecate, dioctyl phthalate and trioctyl phosphate, polymeric tetrahydrofuran, and polyalkyl silicon polymers, such as dimethyl silicone polymers. The synthetic lubricating oils, such as polymeric hydrocarbons or the polar containing compounds may be used as the sole base lubricating oil or admixed with fatty oils and derivatives thereof. In formulating multigrade lubricants light oils of a viscosity range of 60 to 150 SUS at 100° F. are preferred of which light mineral oils of 75 to 100 SUS at 100° F. are specifically useful. For single grade lubricants higher viscosity oils are prepared.

Lubricant compositions of the invention are illustrated by the following formulations:

Composition A:
    The salt of Example I _____ 4% by weight.
    Mineral lubricating oil
      (75/100° F. SUS) _____ Essentially balance.

Composition B:
    The salt of Example I _____ 4% by weight.
    4,4'-methylene bis(2,6-diterbutyl
      phenol) _____ 0.75% by weight.
    10W/30 mineral lubricating
      oil _____ Essentially balance.

Composition C:
    The salt of Example II _____ 4% by weight.
    4,4'-methylene bis(2,6-diterbutyl
      phenol) _____ 0.75% by weight.
    10W/30 mineral lubricating
      oil _____ Essentially balance.

Composition D:
    The salt of Example VI _____ 4% by weight.
    Mineral lubricating oil
      (75/100° F. SUS) _____ Essentially balance.

Composition E:
  The salt of Example III _____ 5% by weight.
  Mineral lubricating oil
    (75/100° F. SUS) _____ Essentially balance.
Composition F:
  The salt of Example II _____ 3% by weight.
  Zn dicyclohexyl thiophosphate _____ 0.8% by weight.
  Mineral lubricating oil
    (100/100° F SUS) _____ Essentially balance.
Composition G:
  The salt of Example X _____ 4% by weight.
  Zn diamyl dithiocarbamate ____ 0.5 by weight.
  Mineral lubricating oil
    (100/100° F. SUS) _____ Essentially balance.
Composition H:
  The salt of Example I _____ 3% by weight.
  Tricresyl phosphate _____ 0.5% by weight.
  4,4′-methylene bis(2,6-diterbutyl phenol) _____ 0.75% by weight.
  Mineral lubricating oil _____ Essentially balance.

The following tabulation sets out the percentage increase in viscosity over the base oil achieved in Composition A at three different temperatures:

Deg. C.:
  38 _____ 39
  99 _____ 46
  130 _____ 58

It can thus be seen that the salt of the present invention achieves a much higher degree of thickening of the base oil at temperatures than at low temperatures.

Composition B was subjected to an antiscuffing test in an automotive engine and exhibited nearly 80% reduction in cam wear as compared with a similar composition in which the salt of the example was replaced by a copolymer of vinyl pyrrolidone and lauryl methacrylate. Also, when subjected to a test for extreme pressure properties on the 4-ball machine, it exhibited improved properties as compared with the said similar composition. Further, Compositions B and C exhibited good low temperature performance properties when used in an automotive engine as evidenced by the absence of sludge formation.

Lubricating compositions of this invention can be modified by addition thereto of minor amounts, such as 0.01% to 2% of conventional additives, such as viscosity index and pour point depressant, e.g. the polyalkyl methacrylate, and alkyl styrene polymers, wax naphthalene condensation products; corrosion inhibitors, e.g. inorganic and organic nitrites, such as $NaNO_2$ or $LiNO_2$ and diisopropylammonium nitrate or dicyclohexylammonium nitrite, extreme pressure and anti-wear agents, organic phospites, phosphates and phosphonates, such as trichloroethyl phosphite, tricresyl phosphate and diLorol phosphate (the word "Lorol" is a registered trademark and the diLorol phosphate referred to above is an ester of Lorol alcohol and phosphoric acid, Lorol alcohol being technical lauryl alcohol obtained by reduction of the fatty acids in coconut oil and being a mixture of saturated straight chain alcohols ranging from about 10 to 18 carbon atoms), phosphorus sulfide-olefinic reaction products, such as $P_2S_5$-terpene reaction products, metal organic phosphates, such as Ca or Zn dicyclohexyl thiophosphate or methylcyclohexyl thiophosphate; organic sulfides, such as wax disulfide and ethylene bistolyl sulfide; simple amines, such as alkyl and aryl amines, e.g. octadecylamine phenyl-α-naphthylamine and oil-soluble aliphatic dithiocarbamates of divalent metals of Group II of the Periodic Table, such as zinc, calcium, cadmium diamyl dithiocarbamate and mixtures thereof.

We claim as our invention:

1. A hydrocarbon lubricating oil containing from about 0.1% to about 15% by weight of an oil soluble alkyldithiophosphoric acid salt of a copolymer formed by the reaction of (1) an unsaturated compound having a polymerizable ethylenic linkage selected from the group consisting of amine-free acrylic and alkacrylic acid esters having from about 10 to about 18 carbon atoms in the ester group and (2) an unsaturated compound having a polymerizable ethylenic linkage and a basic amino nitrogen and selected from the group consisting of a vinyl pyridine and acrylic and alkacrylic esters of basic amine alcohols.

2. A lubricating oil composition comprising a major amount of mineral lubricating oil and from about 1% to about 5% of an oil-soluble non-ash forming polymeric salt, the cationic portion of the salt being a copolymer of 2-methyl-5-vinyl pyridine and a mixture of methyl, lauryl and stearyl methacrylates, the mol ratio of the 2-methyl-5-vinyl pyridine to the ester mixture being from about 1:1 to about 1:4, respectively, and having a molecular weight of from about 75,000 to about 1,000,000 and the anionic portion of the salt being di(3,5,5-trimethylhexyl)acid dithiophosphate.

3. An oil-soluble non-ash forming polymeric salt, the cationic portion of the salt being a copolymer of 2-methyl-5-vinyl pyridine and a mixture of lauryl and stearyl methacrylates in the mol ratio of from about 1:1 to about 1:4, respectively, and having a molecular weight of from about 75,000 to 1,000,000 and the anionic portion of the salt being di(3,5,5-trimethylhexyl)acid dithiophosphate.

References Cited

UNITED STATES PATENTS

| | | | |
|---|---|---|---|
| 2,944,974 | 7/1960 | Lorensen et al. | 252—51.5 |
| 2,285,853 | 6/1942 | Downing et al. | 252—32.5 X |
| 2,653,133 | 9/1953 | Catlin | 252—51.5 |
| 2,666,044 | 1/1954 | Catlin | 262—51.5 X |
| 2,683,691 | 7/1954 | Thorpe et al. | 252—32.5 |
| 2,728,751 | 12/1955 | Catlin et al. | 252—51.5 X |
| 2,737,496 | 3/1956 | Catlin | 252—51.5 |
| 2,773,860 | 12/1956 | Musselman | 252—32.7 X |
| 2,866,729 | 12/1958 | Zimpel | 252—51.5 |
| 2,882,228 | 4/1959 | Watson et al. | 252—32.5 |
| 2,889,282 | 6/1959 | Lorensen et al. | 252—51.5 |

FOREIGN PATENTS 799,037   7/1958   Great Britain.

OTHER REFERENCES

Zuidema, "Performance of Lubricating Oils," 1952, published by Reinhold Publishing Corporation, pp. 34–37, pertinent.

DANIEL E. WYMAN, *Primary Examiner.*

PATRICK P. GARVIN, ALPHONSO D. SULLIVAN, MORRIS LIEBMAN, LEWIS GOTTS, JULIUS GREENWALD, *Examiners.*

E. W. GOLDSTEIN, J. R. SEILER, F. M. SIKORA, J. R. GENTRY, G. O. ENOCKSON, *Assistant Examiners.*